(12) United States Patent
Klingman

(10) Patent No.: US 7,187,662 B1
(45) Date of Patent: Mar. 6, 2007

(54) TABLE DRIVEN CALL DISTRIBUTION SYSTEM FOR LOCAL AND REMOTE AGENTS

(76) Inventor: Edwin E. Klingman, 3000 Highway 84, San Gregorio, CA (US) 94074

( * ) Notice: Subject to any disclaimer, the term of this patent is extended or adjusted under 35 U.S.C. 154(b) by 0 days.

(21) Appl. No.: 09/387,938

(22) Filed: Sep. 1, 1999

Related U.S. Application Data

(63) Continuation-in-part of application No. 09/372,666, filed on Aug. 11, 1999, now abandoned.

(51) Int. Cl.
*H04Q 11/00* (2006.01)
(52) U.S. Cl. .................................................. 370/270
(58) Field of Classification Search ........ 370/260–262, 370/264, 270–271, 389, 392, 400, 401, 438, 370/422, 352, 432, 465; 709/239, 243; 379/265.02, 379/265.05, 266.1, 261.1
See application file for complete search history.

(56) References Cited

U.S. PATENT DOCUMENTS

| 5,430,709 | A | | 7/1995 | Galloway | |
|---|---|---|---|---|---|
| 5,838,682 | A | | 11/1998 | Dekelbaum | |
| 5,841,839 | A | * | 11/1998 | Fogg et al. ............... | 379/88.25 |
| 5,960,004 | A | | 9/1999 | Ramstrom et al. | |
| 5,987,527 | A | | 11/1999 | Cahill, III | |
| 6,046,762 | A | * | 4/2000 | Sonesh et al. ................ | 348/16 |
| 6,061,512 | A | | 5/2000 | Lin et al. | |

(Continued)

OTHER PUBLICATIONS

Newton, *Newton's Telecom Dictionary*, Oct. 1998, Telecom Books, p. 858-859.*

Newton, *Newton's Telecom Dictionary*, Oct. 1998, Telecom Books, p. 858-859.

(Continued)

*Primary Examiner*—Chi Pham
*Assistant Examiner*—Ronald Abelson
(74) *Attorney, Agent, or Firm*—Anthony B. Diepenbrock, III; Dechert LLP

(57) ABSTRACT

A table driven call management system for an organization having a plurality of departments and agent. The call management system is capable of supporting local and remote agents each of which can have the same degree of access to the organization's information. Calls are received by the call management system and handled according to a table describing a department in the organization. If an agent for the department is available according to the table, the call is transferred to the agent, either local or remote. If the agent is not available, the call is transferred to another department according to an entry in the table. If no department has an agent available to take the call, a caller message is recording in a department mailbox or a default mail box or the call is transferred to an available operator. Call management software is object oriented having only two objects, a call manager object and an array of call objects, each call object including a department table with which the call is currently associated. The software is flexible so that the department tables can be tailored to the organization and the handling policy can be easily changed. To implement the system only the department tables describing the organization's structure and the voice menus need to be entered into the call management system. The call management system eliminates the need for a separate telephone system for the organization and any private switch. A plurality of computers in the organization can function as a distributed call management system.

41 Claims, 16 Drawing Sheets

U.S. PATENT DOCUMENTS

| | | | |
|---|---|---|---|
| H1898 H | 10/2000 | Doughty et al. | |
| 6,167,060 A | 12/2000 | Vargo et al. | |
| 6,175,560 B1 | 1/2001 | Bhagalia et al. | |
| 6,269,254 B1 * | 7/2001 | Mathis | 455/557 |
| 6,292,554 B1 | 9/2001 | Oden et al. | |
| 6,396,909 B1 * | 5/2002 | Reksten et al. | 379/88.18 |
| 6,411,697 B1 | 6/2002 | Creamer et al. | |
| 6,430,275 B1 | 8/2002 | Voit | |
| 6,438,559 B1 * | 8/2002 | White et al. | 707/103 R |
| 6,466,570 B1 | 10/2002 | Low et al. | |
| 6,490,273 B1 | 12/2002 | DeNap et al. | |
| 6,492,989 B1 * | 12/2002 | Wilkinson | 345/440 |
| 6,493,447 B1 | 12/2002 | Goss et al. | |
| 6,502,127 B1 | 12/2002 | Edwards et al. | |
| 6,504,913 B1 | 1/2003 | Patterson et al. | |
| 6,577,724 B1 * | 6/2003 | Hagemann | 379/229 |

OTHER PUBLICATIONS

Newton, *Newton's Telecom Dictionary*, Oct. 1998, Telecom Books, pp. 858-859.

USPTO Office Action mailed Jul. 11, 2005, on U.S. Appl. No. 09/443,922.

* cited by examiner

| Menu Item | Next Menu | Next Dept | Voice Mail | Transfer to | Directory # | Agent Status |
|---|---|---|---|---|---|---|
| Oper |  | Oper |  | Oper | 33 | ✓ |
| Sales | test.spl | Sales |  |  |  | X |
| Tech | main.spl | Tech |  | Eddie | 97671111 | ✓ |
| Acct | Acct.au | Acct | test.spl |  |  | X |
| Ship |  |  | main.spl |  |  | X |

TABLE 1

| Menu Item | Next Menu | Next Dept | Voice Mail | Transfer to | Directory # | Agent Status |
|---|---|---|---|---|---|---|
| Domestic |  | Oper |  | Karen | 41 | X |
| International | main.spl | Main |  |  |  | X |
| OEM | test.spl | OEM1 |  |  |  | ✓ |
|  |  |  |  |  |  | X |
|  |  |  |  |  |  | X |

TABLE 2

FIG. 7

```
public void Listen()
{
    for( int n = 0; n < max, n++)
    {
        if ( Caller[n] == 0 )        // array of handles
        {
            Call[n]= new ISDNcall();

Listener[n]= Call[n].Listen( Call_mask );
        }
    }
}
```
— 300

FIG. 11A

```
//|
//|    no agent avail, no next menu!
//|
        Call[n].stop_play();

MailFile = thisDept.getVoiceMail( dtmd );

saveLink = ISDNmenu.Open( MailFile );

if( saveLink != null )
        {
            Call[n].record( saveLink );

} else { // no agent, no menu, no mail
                 // switch to default voice mail
        }
}
```
— 306

```
thisDept = Call[n].dept();

Agent = thisDept.getNextAgent( dtmf );

if( Agent != null )
 {
   // transfer call to Agent

DNagent = thisDept.getAgentDN( dtmf );

Xfer_ret = Call[n].Transfer();      // begin transfer if( Xfer_ret == 0 )     // success
       {
               Call[n].agent( Agent );

Call[n].DNagent( DNagent );

} else { // failed attempt to transfer call to Agent }
 } else { // no Agent available or appropriate
```
— 302

```
// no Agent available or appropriate dtmenu = thisDept.getNextMenu( dtmf );

Call[n].stop_play;     // stop playing voice menu if( dtmenu != null )
      {
      menuLink = ISDNmenu.open( dtmenu );

if( menuLink != null )
        {
          Call[n].play( menuLink );

} else {       // no menu avail }

} else {  // no voice menu avail  )
//|
//|  Now update the embedded departmant table:
//|
       Deptname = thisDept.getNextDept( dtmf );

if( Deptname != null )
     {
         Department[n] = DeptTables.xlat( Deptname );

//-- now embed next department model in Call[n]

Call[n].dept( Tmodel{ Departmant[n] ]);
     }

}
  else { //no agent avail, no next menu!
```
— 304

TABLE DRIVEN CALL DISTRIBUTION SYSTEM FOR LOCAL AND REMOTE AGENTS

RELATED APPLICATIONS

This is a continuation-in-part of U.S. application Ser. No. 09/372,666, filed Aug. 11, 1999, now abandoned and entitled "A Table Driven Call Distribution System For Local And Remote Agents".

FIELD OF THE INVENTION

The present invention relates to managing incoming calls for an organization having local and remote agents. More particularly, the present invention relates to a computer system in an organization having a flexible call management software program for receiving and transferring incoming calls to agents, local or remote, in the business organization according to the caller's input and to one or more tables corresponding to the organization of the business.

BACKGROUND

Typical organizations today conduct business using at least two kinds of systems. The first system is the telephone system. The second system is a plurality of computers internally connected in some fashion within the organization.

FIG. 1 shows a common configuration for a department within an organization. In FIG. 1 the telephone system is represented by the cloud 10 labeled "Public Switched Telephone Network" (PSTN) which includes a number of public switches 12, 14, 16. Many organizations use a particular public switch 14 for their telephone needs, although very large organizations may employ a private switch (PBX). Switch 14 is dedicated, in part, to handle the incoming calls for the organization. An incoming call from a remote caller 18 is routed through the PSTN 10 to the organization's local switch 14 and then routed to an operator console 20 for the organization. The operator then transfers the call to one of the agents' telephones 22, 24, 26 in the organization by means of switch 14. If the agent is not available the call is usually transferred back to the operator and then to a voice mail system attached to the public switch 14 dedicated to the organization.

FIG. 1 also shows a typical computer system configuration within the organization. Most persons within the organization have desktop personal computers 28, 30, 32. These personal computers today are usually connected to a local area network 34, 36 which connects the users to each other and to a business database system 38. The business database system typically contains information necessary for the business to serve its customers such as customer order information or inventory information. Some business database information may be shared by all of the agents of the organization, and some business information may be accessible to particular departments within the organization. Data traffic patterns between the various agents in the organization and between the agents and the various business databases may require that several local area networks be used. It is customary practice to keep each department within the organization on its own local area network. In FIG. 1 there are two departments, the first department having agents 28, 30 connected to local area network 34 and the second department having agent 32 connected to local area network 36. The two local area networks are connected to a hub 40 which gives the agents access to the business database 38 and to each other. The two departments may share a fax machine 42 which is connected to the public switch 14. All connections to the public switch 14 are over standard analog telephone lines 50, 52, 54, 56, 58, 60. Connection by the caller to the public telephone network 55 and remote agent connection 43 are also standard analog telephone lines.

Such a system, as described above, operates as follows. A caller 18 interested in obtaining some information about his order calls the organization. The call is routed through the telephone network to the public switch 14 for the organization and the operator at console 20 answers the call. The operator listens to the request from the caller 18 and determines which department in the organization is best able to handle the request. The operator then transfers the call to one of the agents in that department via the switch 14. An agent 22 receives the call and asks the caller for information which the agent then enters into his desktop personal computer 28 to access the business database across the local area network to which he is connected. Information is retrieved and read back to the caller, who if satisfied, then disconnects from the organization telephone system. As can be noted from FIG. 1, the telephone system is completely disconnected from the computer network. Agents are required to bridge the gap between the caller in the telephone system and the business database.

Some commercial systems have made improvements to a system similar to the one shown in FIG. 1. One such system is the Wells-Fargo Bank Automated Call Distribution (ACD) system. This system employs a private switch (PBX) for the organization, rather than public switch 14 and attaches a voice response unit (VRU) to the private switch. The VRU asks the caller, a customer, to enter information such as the customer's account number, and the telephone system then "whispers" the account number to the agent before connecting the agent to the customer. This requires that the agent type the account number into his DeskTop PC to access the customer's account in the business database.

Another commercial system is the Siemens Intervoice System. In this system, touchtone information from the caller's telephone is exchanged across a network of call centers, in which the agent telephone LCD display is populated with up to 48 alphanumeric characters of information supplied by the system. These characters identify the caller and his or her needs, including the customer's name and account number. Information in the telephone display is not available to the business computer network. The agent must re-enter the data from the LCD display into his or her DeskTop PC. This represents not only an extra step (multiplied by thousands of calls per agent) but also represents a major source of error, since transcribing by hand is always more error prone than automated entry.

Other commercial systems having a private switch (PBX) connect the switch directly to the Local Area Network. In these systems a "pop up" window on the agent's computer has the caller information available when the call is transferred to the agent's desk phone. While these systems may address some problems, they are incapable of handling a remote agent.

In FIG. 1 a remote agent is one who is not physically connected to a department local area network within the organization. A remote agent office may have a laptop computer 40 with a modem 42 to access the public telephone network 10 as well as a telephone 44 and fax machine 46 to carry out the usual functions required in the agent's office. The remote agent connects to a different public switch 12 from the public switch 14 or private switch (not shown) used to handle the organization. Typically, the remote agent does not have access to the local area networks of the organization nor to any private switch the organization may use to handle incoming calls. This means that calls cannot be transferred to the remote agent to handle as a local agent would. They remote agent is simply not supported by a configuration such as shown in FIG. 1.

Thus, current systems suffer from a number of deficiencies. Some systems require the agents to manually enter information already present in the telephone system into the business database to formulate queries to answer requests for information by the callers. Other systems require that the business database be accessed via a LAN which implicitly prevents remote agents from being employed as a part of the organization. Current systems maintain a separation between a Voice Response Unit, the LAN and the desktop telephones and cannot transfer calls to a remote agent. Therefore, there is a need for a call management system that is capable of being completely integrated with the business data network.

SUMMARY

The present invention is directed to an apparatus and method that satisfies the above needs. The apparatus comprises a computer system connected to the public switched telephone network and to the business data network, the computer system having a program instructing the computer to receive an incoming call from a caller by a call manager object; to create an associated call object for each incoming call in response to receiving the incoming call; to play a voice menu corresponding to a plurality of selection items in a department table for the organization to the caller over a telephone line, each call object including the department table with which the call is currently associated; to detect incoming signals from the caller on an the telephone line in response to a voice message played for the caller; to access the table based on the incoming signals from the caller; and to connect the caller to any available agent according to a call-management policy based on the table. An additional aspect of the invention is that calls can be transferred to remote agents who have the same access as local agents to the business organization database. A method meeting the above needs includes the steps of: receiving one or more incoming calls by a call manager object; creating an associated call object for each incoming call in response to receiving the incoming call, playing to the caller a voice menu describing a plurality of selection items in a department table corresponding to a department in the organization, each call object including the department table with which the call is currently associated; receiving one or more input signals from the caller in response to the voice menu played to the caller; and managing the incoming call according to a call-management policy based on the information contained in the table and the input signals from the caller to attempt to reach one of the plurality of agents of the organization.

The present invention has the advantages that one or more computers of the organization can perform the call management functions needed by the organization, that a table for each department of the organization can determine how a call is handled by that department, that customer information received over the public telephone network need not be re-entered into the business computer systems, that calls can be transferred to remote agents who have access to the business computer systems, and that no private switch is required by the organization.

DRAWING

These and other features, aspects and advantages of the present invention will become better understood with regard to the following description, appended claims, and accompanying drawings where:

Figure 4:
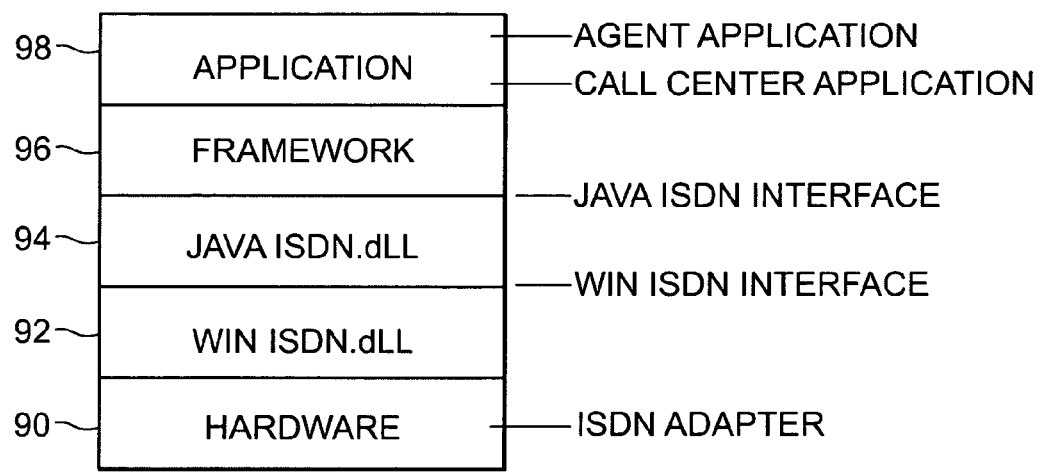
Figure 5:
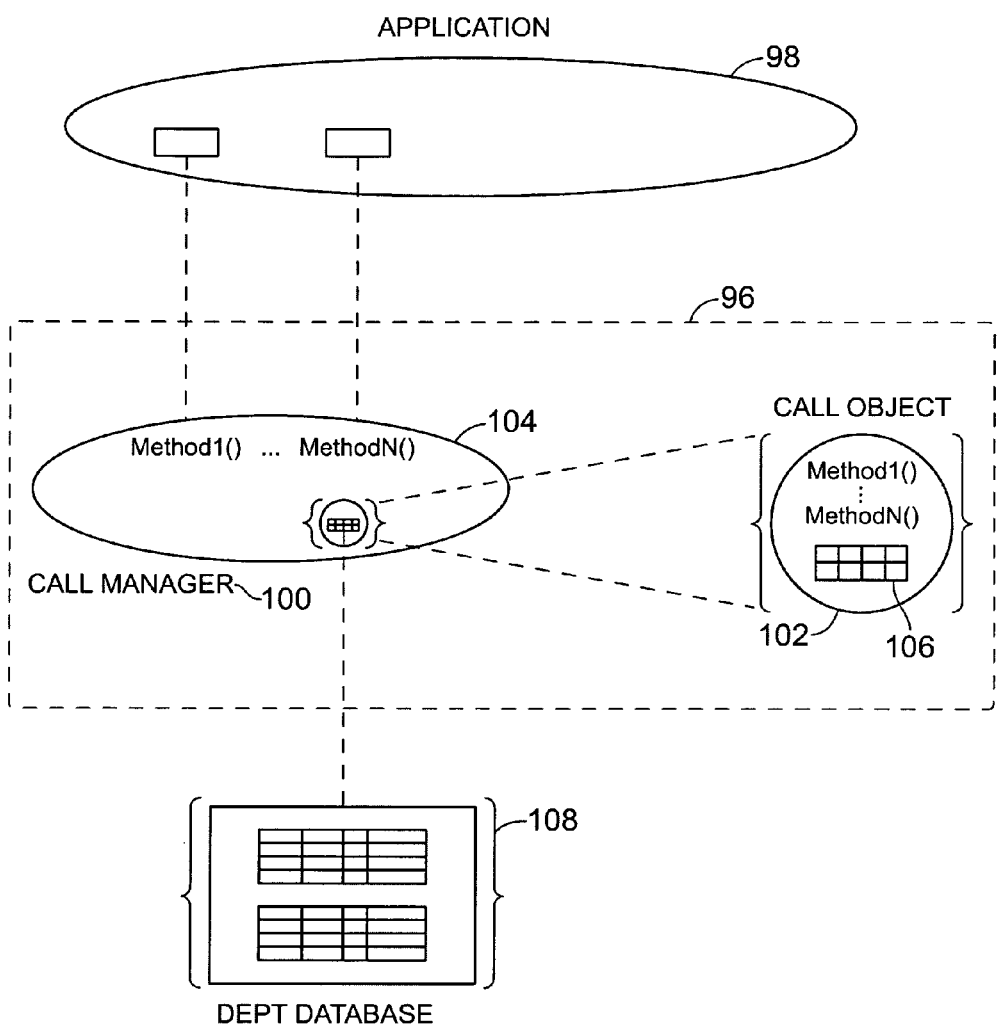
Figure 6:
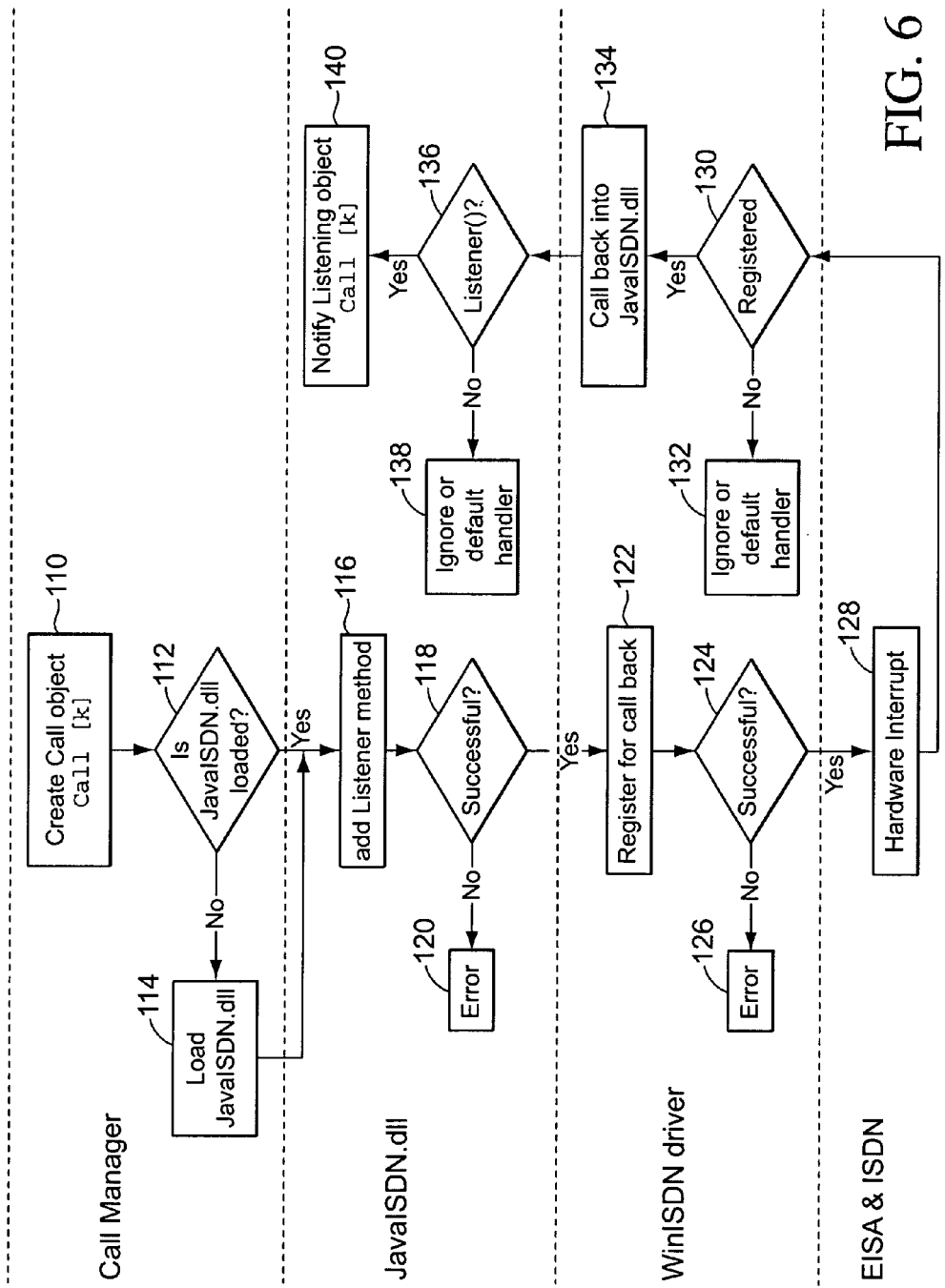
Figure 8:
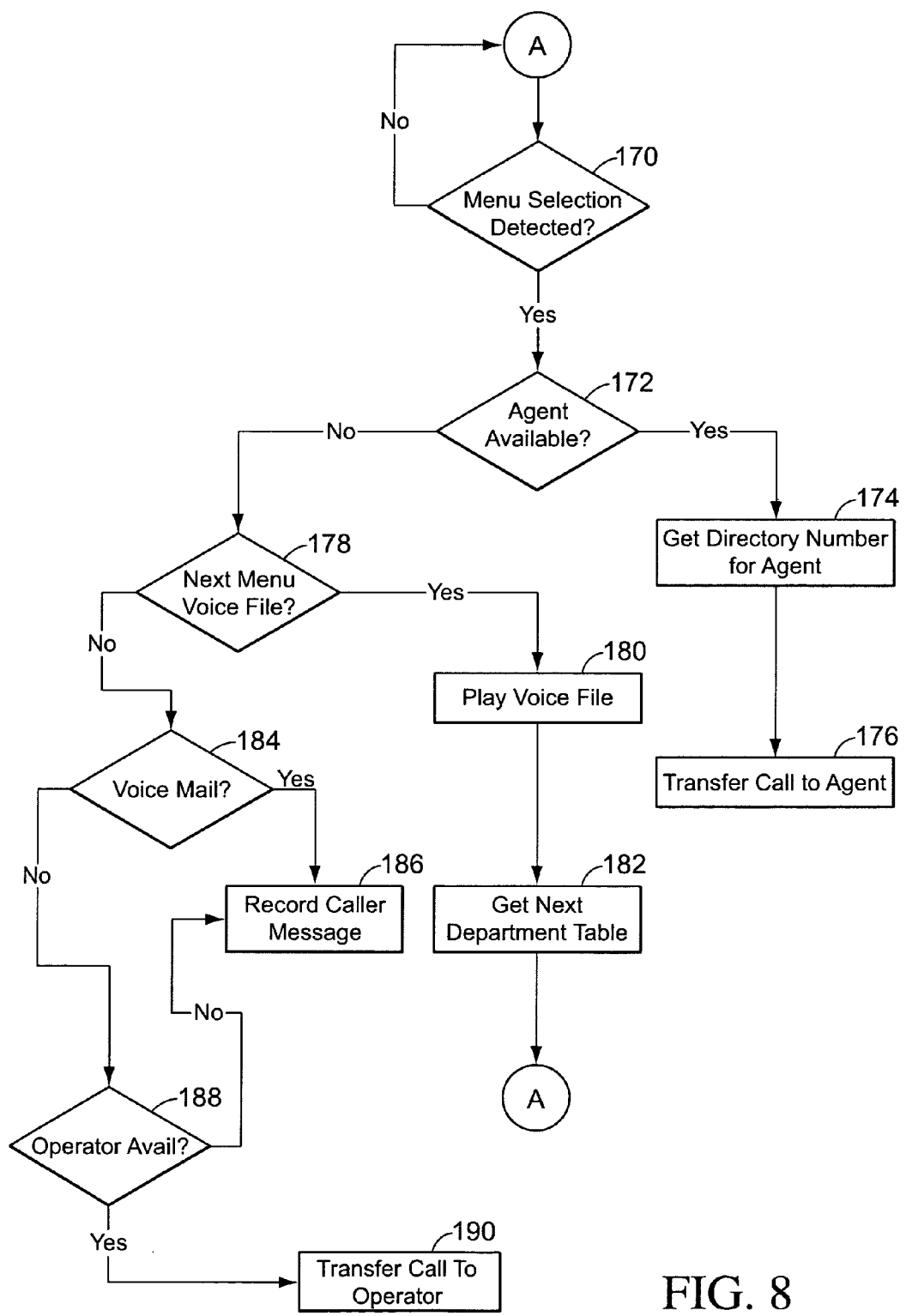
Figure 9:
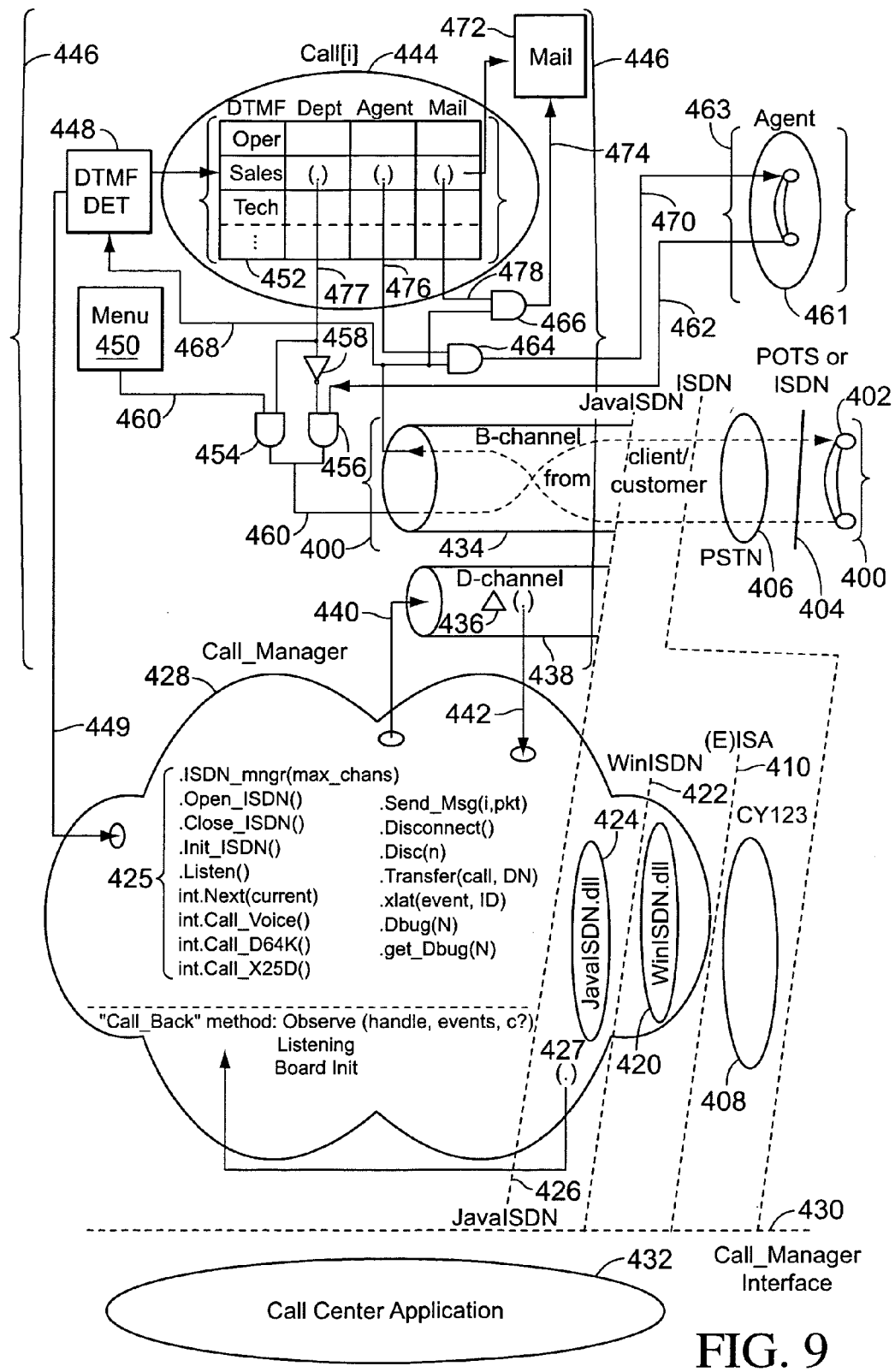

FIG. 4 sets forth the software layers according to a version of the present invention;

FIG. 5 shows two important objects used in the present invention for the framework layer of software as shown in FIG. 4;

FIG. 6 sets for the steps in the call back method according to a version of the invention;

FIG. 7 sets forth a representative set of tables according to the present invention;

FIG. 8 sets forth a default policy of handling incoming calls in conjunction with the tables of FIG. 7;

FIG. 9 sets forth a conceptual model of the call management system;

FIGS. 10A, 10B 10C, 10D and 10E set forth the flow of operations for a call entering and leaving the call management system; and FIGS. 11A, 11B and 11C set forth portions of Java code for one version of the present invention.

DESCRIPTION

Figure 1:
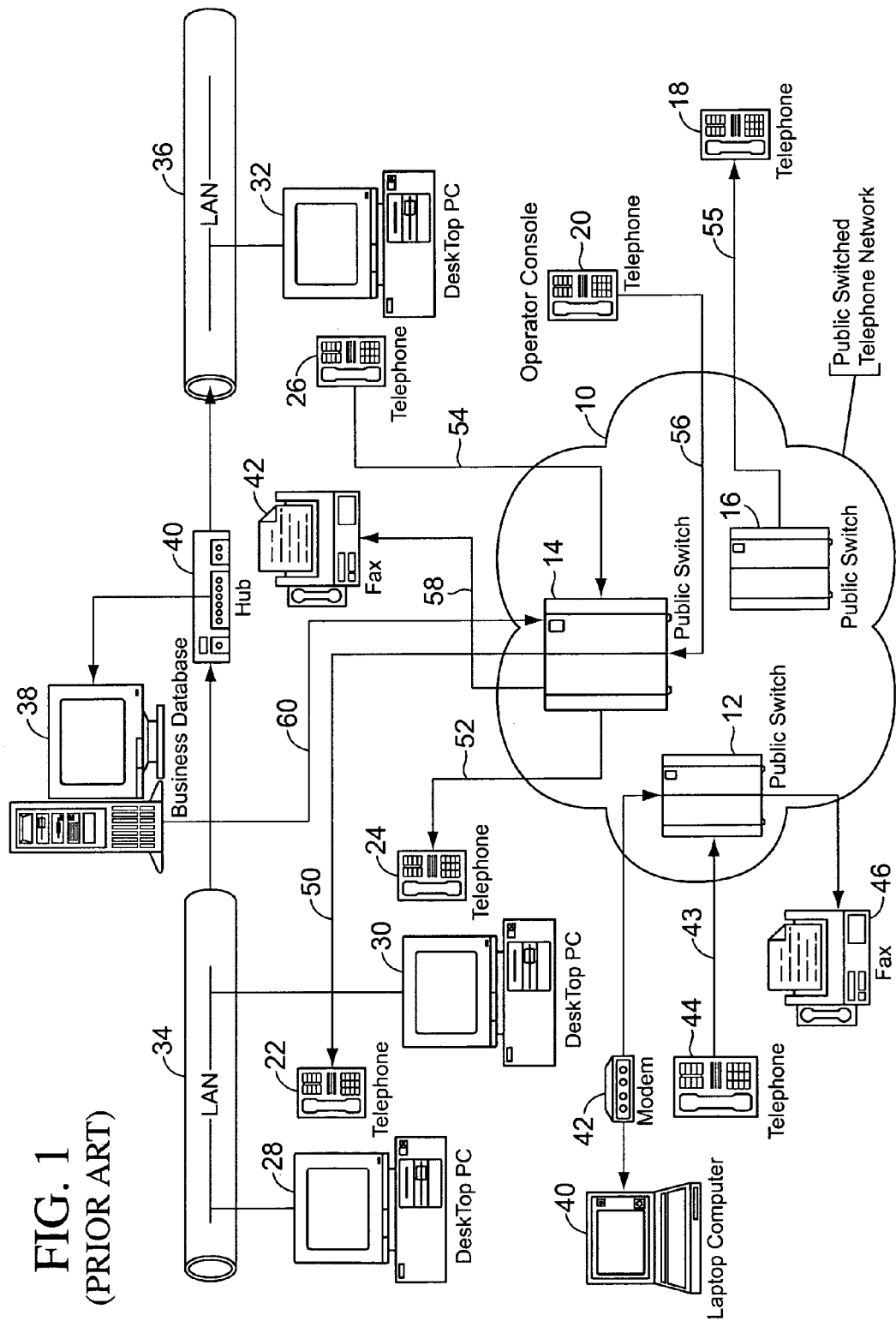
FIG. 1 shows a common prior art configuration for managing incoming calls to an organization.
Figure 2:
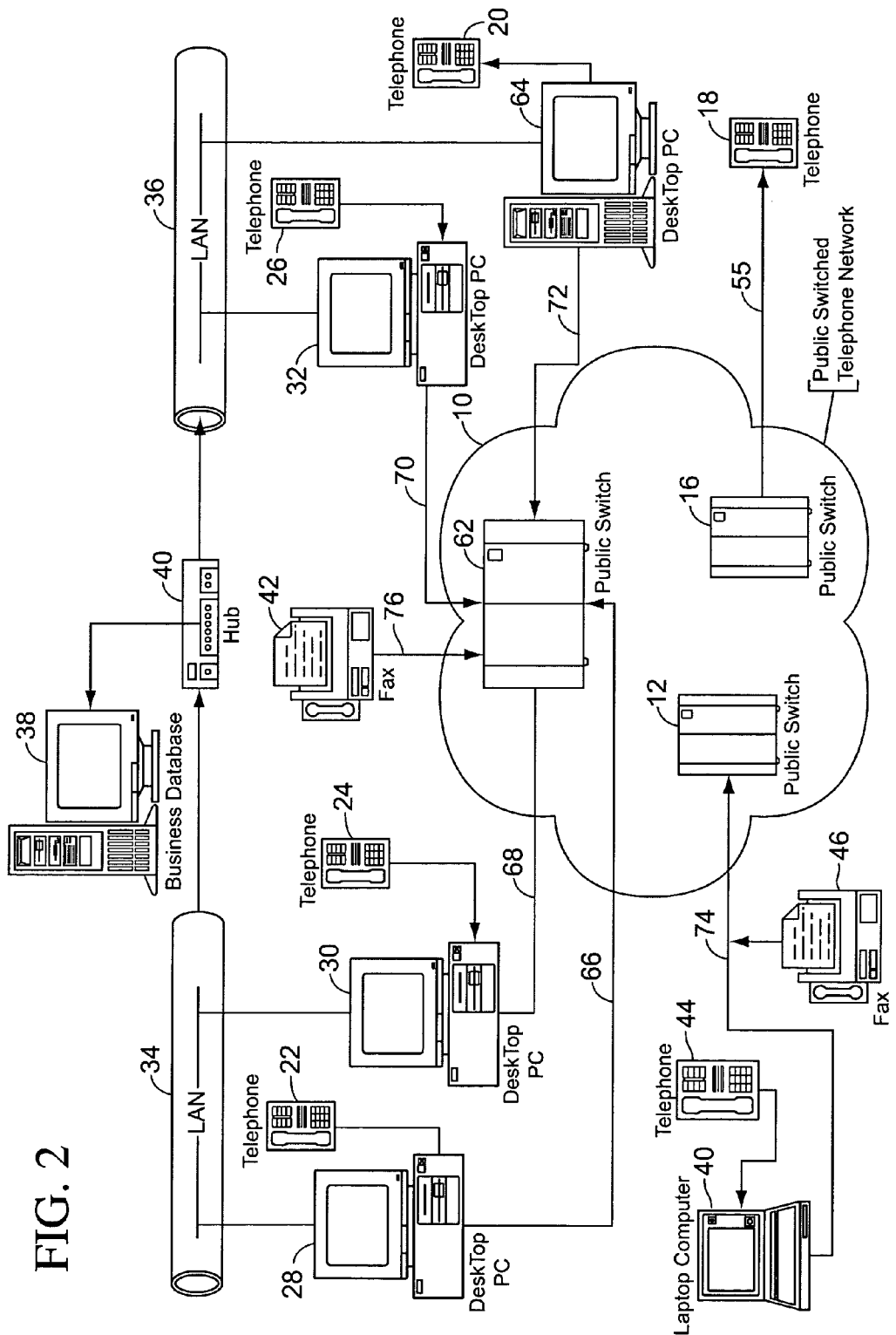
FIG. 2 shows a call management system configuration according to a version of the present invention.

FIG. 2 shows a call-management system configuration according to one version of the present invention. Items similar to the ones in FIG. 1 are similarly labeled. However, public switch 62 for the organization is an ISDN switch and each of the lines 66, 68, 70, 72, 74, 76 is an ISDN line. To adapt the DeskTop Pcs to connect to the ISDN switch 62 an adapter card is required as shown pictorially in FIG. 3. Any computer in the organization that connects to the ISDN switch can have an ISDN adapter card. Not all computers in the organization need to connect to the ISDN switch but such a configuration is possible according to the present invention. Computers in the system are adapted to become either agent computers or call-center computers. In FIG. 3, computer 64 is adapted to be the call-center computer. At least one call-center computer is needed for the organization. However, in one version of the present invention, every computer in the organization is configured to be a call-center computer, thus realizing a distributed call management system. Telephones 20, 22, 24, 26, 44 for the agents are now directly connected to the DeskTop Pcs 64, 28, 30, 32, 40 respectively. These telephone connections give the agents, including remote agents, access to each other over the ISDN lines and even, if desired over the Internet. In some cases, it is only necessary to connect a handset or headset to the DeskTop PC but either arrangement is possible.

Figure 3A:
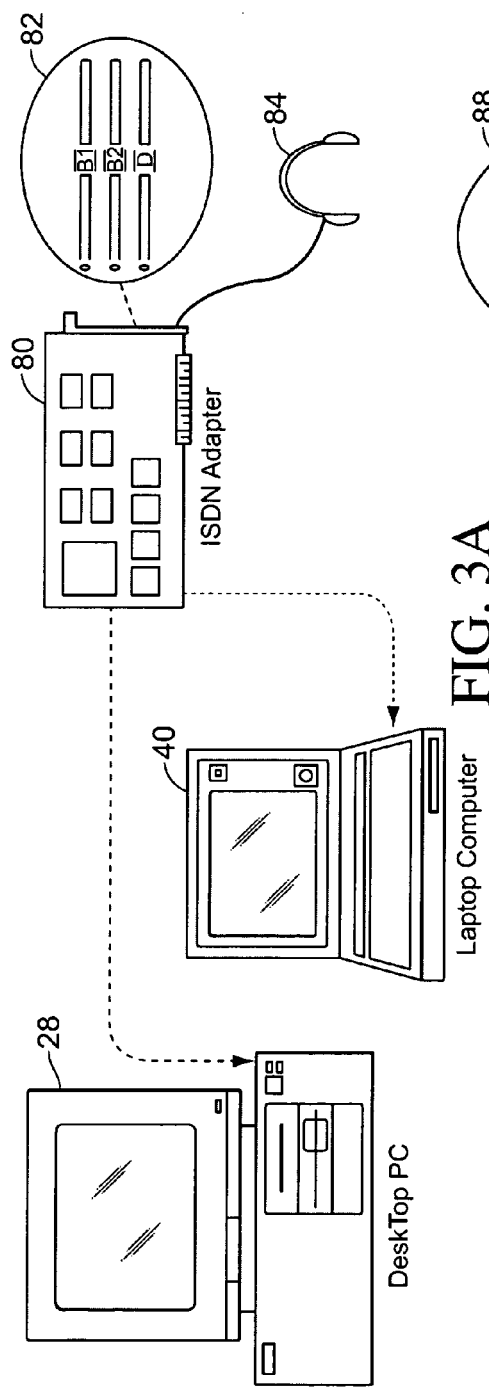
FIGS. 3A and 3B show ISDN adapter hardware used in the present invention.
Figure 3B:
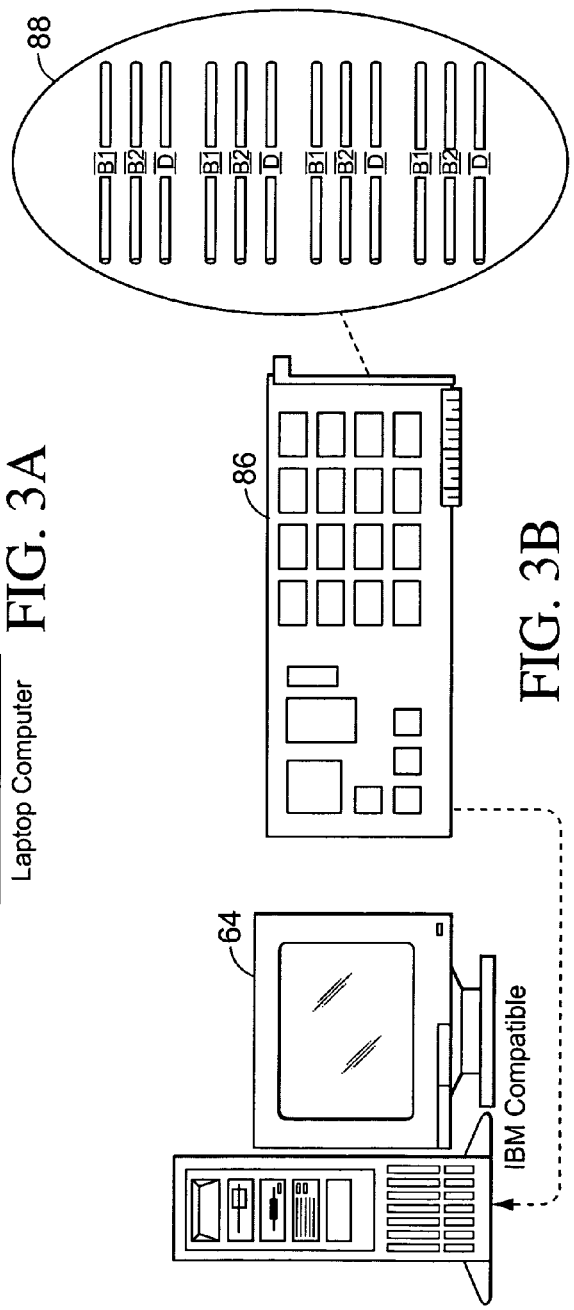

FIG. 3A shows an ISDN adapter card typically used for either the DeskTop PC 28 or a laptop computer 40 used by an agent. This card 80 supports a single ISDN Basic Rate Interface (BRI) 82 which includes two B channels and one D channel. Headsets 84 or handsets are connected to the ISDN adapter card. An ISDN adapter card 86 for use in a call center computer 64 can support up to eight B channels and four D-channels 88. The adapter cards (available from ISDN*tek, San Gregorio, Calif.) utilize standard RJ-45 connectors and S/T or U transformers and connections to couple to the ISDN line and have an EISA or ISA bus connection to provide interrupt to the computer in which they are installed. Typically an ISDN BRI line is connected to these adapter cards. As is known by those skilled in the art, each of the two BRI line B-channels is used to carry voice and data services at 64 Kbps and the D channel at 16 Kbps carries signaling and administrative information used to set up and terminate calls. Such services as Hold, Transfer, Conference, Caller ID are supported on the ISDN D channel. Up to 8 ISDN devices can connect to a single BRI line and can all share the B-channels and the D-channel. The ISDN adapter cards make use of the B-channels to play voice menus to the caller and to receive caller input signals, either tones or voice. The adapter cards also make use of the D-channel to manage the incoming calls as discussed below. The call center computer is thus a source of voice messages to the caller, the recipient of voice or input signals such as DTMF tones and voice messages from the caller and a transferring station to connect the caller to an agent. Voice or other input selection signals such as DTMF tones from the caller are received by detection software within the call center computer. Voice messages received from the caller are stored in voice mail boxes by the call center computer. Voice messages such as voice menus are played by the call center computer to the caller.

Referring to FIG. 4, a simplified view of the software layers involved in the present invention is depicted. Closest to the hardware 90 is the WinISDN.dll driver 92. This layer of software responds to specific C language calls in the Windows TM environment which runs on the call center computer 64 in FIG. 2 and manages the ISDN adapter hardware from different manufacturers including ISDN*tek (San Gregorio, Calif.). The next layer is the JavaISDN.dll 94 layer which acts as interface software between the WinISDN driver 92 and the Framework layer 96 which is implemented using the Java Language. Finally, the top layer 98 is the call center application or the agent application, the particular application software depending on whether the computer is a call-center computer or an agent computer. As stated above, the operating system assumed to be running on the computer is some version of Windows TM, including WinNT. Also assumed is that there is a Java Interpreter within a Java Run Time Environment (JRE) active on the computer so that the Framework layer of Java code can execute.

The Framework Layer

FIG. 5 shows the Framework layer 96 of the call-management software in more detail. Included in the Framework are the Call_Manager 100 and one or more Call objects 102 organized into an array 104 (an array is indicated by curly braces). Every incoming call has a Call object. Preferably the Call_Manager 100 is a Java object (i.e., an instantiation of a Java class) which has a number of methods, Method1( )–MethodN( ), in its class, ISDN_mgr, for carrying out Call_Manager functions. Similarly the Call object 102 is a Java object having a number of methods Method1( )–MethodN( ) in its class, ISDNcall, for carrying Call object functions. Some actual methods in the Call object are dept( ), play( ), record( ) and Transfer( ). These and other methods are described below. Also included in the Call object is a table 106 containing information about the department to which a call is currently connected. Department tables are stored in the department's database 108 and are accessible to the Call_Manager 100. The Call_Manager and Call objects carry out their methods according to the information in the department tables of each call object.

Having a Framework layer comprising only two basic, comparatively simple objects, hides the actual complexity of the system but makes the system easier to deal with at the application layer. To the application layer, the Framework is designed to appear as an integral unit that accepts messages and emits messages both streaming and packet. The internal workings of the Call_Manager and Call objects are beneath the interface and their implementation details are not essential as long as their behavior is maintained.

Call Back System

As described in FIG. 4, the Framework layer comprising the Call_Manager and one or more Call objects sits above the JavaISDN.dll layer. This latter layer serves as an interface between the Framework layer and the driver, WinISDN. One of the functions of this layer and the driver is to inform the Framework layer of events occurring at the hardware level. The hardware level events correspond to events on the ISDN channel on which the incoming call is present and it is important to the implementation that these events become known at the Framework layer so that the Call_Manager can carry out its functions. To communicate events from the hardware layer to the Framework layer a call back system between the layers is implemented according to one version of the invention.

FIG. 6 shows the preferred call back system between the software layers for the present invention. Each layer of software is labeled in the figure. In step 110 Call_Manager creates a Call object and tells it to "listen" for incoming calls. The Call object makes sure the JavaISDN.dll is loaded in steps 112 and 114 and registers to "listen" for incoming calls by adding the Listener method in step 116. If the step of adding the Listener method is successful as determined in step 118, the flow continues to the WinISDN driver. The JavaISDN layer uses the WinISDN interface to register in step 122 with the WinISDN driver to "listen" for incoming calls. If this registration is successful in step 124, the Call object has been linked up with the hardware. When an incoming call occurs, the ISDN hardware interrupts the WinISDN driver, which checks the registry in step 130 and finds a callback address into JavaISDN. WinISDN then calls JavaISDN at this address in step 134. JavaISDN then calls the specific Call object having the Listener method in step 136 for the event to inform it in step 140 that an incoming call has arrived. Steps 120 and 126 handle the case if a registration step fails. Steps 132 and 138 handle the error conditions if the callback is not registered or the Listener method is not available. The result of this callback system is that the Framework layer is notified in "real time" of an event occurring in the Public Switched Telephone Network. This means that either the Call_Manager or any existing Call objects can respond in real time to these events.

Department Tables

To describe the functions of the Call_Manager and Call objects and the sequence of events to manage calls it is first necessary to describe the tables guiding the activities of these objects. A representative table is shown in FIG. 7. Table 1 in FIG. 7 is the "main" department table. This table describes the departments in the organization from the highest level. The fields of a row in the table specify information for handling calls for the department named in the first field, labeled Menu Item 150, of the row. The information fields in a row are the Next Menu 152, Next Dept 154, Voice Mail 156, Transfer To 158, Directory # 160, and Agent Status 162 fields. The Next Menu field specifies a voice menu to play for the entry in the next field, the Next Dept field. This latter field specifies a department table for the department in the first field of the row. The Transfer To and Directory # fields indicate an agent of the department to which the call can be transferred and the directory number of the agent receiving the transfer. The Voice Mail field indicates the availability of voice mail for the department in case the agent is unavailable as indicated by the Agent Status field. For the representative Table 1 in FIG. 7, the sales department row states that there is a selectable sales department table and a voice menu, test.spl, corresponding to it. For the tech department, there is a tech department table and voice menu, main.spl for it, as well as an agent, Eddie, available who can be reached at 9767111. If the sales department table is selected by the caller Table 2 in FIG. 7 is invoked. Table 2 has the same fields as Table 1 but instead the fields pertain to the sub-departments of the sales department. The Domestic sales department has an agent Karen at directory number 41, but this agent is unavailable according to the Agent Status field. The OEM department has its own department table, OEM1, and corresponding voice menu, test.spl.

In one version of the present invention, the agent can update his or her status field and telephone number in the department table in which that agent is named. This is done by accessing the database, in one version of the present invention a JDBC-accessible database, having the department tables and altering the entry. If an update is required in multiple tables a more sophisticated update mechanism may be required and, of course, some fields in the table can be protected from alteration. Remote agents can update their status as well over their ISDN lines using either the B-channel or the D-channel with X.25 protocols. Thus, a sufficient number of tables can describe the structure of an entire organization and each department in that organization can determine which agents, if any, are available to receive incoming calls. Alternatively, department tables can be extended to have more rows to describe larger numbers of departments and sub-departments of the organization and can be extended to have more columns in which many agents for that department or sub-department can be listed. In another alternative, a large department can have one agent directory number which is a hunt group for a large number of agents. In yet another alternative, prior to selecting the voice mail for a department, the call center can send a prompt voice message to the caller or request a password. Also, according to the present invention, tables can include Java objects of various types such as XML objects, Boolean objects, file objects, other table objects, directory number objects and agent name string objects. All such objects can be accessed by the Call_Manager and interpreted accordingly. Because tables can be treated as Java objects according to the present invention, they can localize changes to one layer of the software and hide the effects from other levels of the system. Changing the structure of a table may require a change to the Call_Manager and Call objects. The ability of Java to download Java objects means that the Call_Manager can easily be remotely updated (subject to appropriate security precautions) and Call objects can be transferred to other subsystems as needed.

Referring to FIG. 8, a call-management policy according to one version of the present invention for handling calls according to a department table is described. When an incoming call is received a Call object is created for that call by the call manager and a table, initially the "main" table, is embedded in the Call object. According to that table, a voice menu is played for the caller and the caller's response and table fields determine how the call is handled. The first response the caller makes is to select a row in the table by selecting one of the menu items in step 170 in the voice menu. In step 172 the Call_Manager check the Agent Status field for the selected row of the table to determine if an agent is available. If the agent is available, the Call_Manager obtains the directory number of the agent from the Directory # field in step 174 and transfers the call in step 176 to the agent's headset, which is connected to the agent's computer as shown in FIG. 2. If the agent was not available, but another department table is available as determined in step 178, the voice menu for the selected department is played to the caller in step 180 and the department table corresponding to the voice menu is retrieved from the department database and embedded in the Call object in step 182. At this point the Call object has a new department table for handling the call for that department. Flow in FIG. 8 returns to step 170 to await the caller's response to the new set of voice menu items from which the caller must choose. If no agent is available and no other department table is available, the caller is transferred to voice mail in step 184 and the caller's message is recorded in step 186. If voice mail is not available and an operator is available as determined in step 188, the call is transferred to the operator in step 190 or otherwise to voice mail. The result of this process is that an incoming call is transferred to an agent of a particular department, to voice mail or to an operator. Other policies for handling calls are possible. In one alternative, a selector can select one of several polices available. In another version of the invention, the handling policy for some or all the departments is different and depends on the department. The application designer of the call management system does not need to write any programs to have a usable application. To implement the above policy, all that is required is data entry into the tables and the creation of voice menus according to the structure of the organization, both of which can be highly automated.

Referring to FIG. 9, a conceptual model in accordance with the present invention is set forth. A caller is represented by handset 402 which is connected to a POTS line or ISDN line 404 of the telephone network 406. Braces 400 indicate that one or more callers may be connected to the system each with his own line. The ISDN interface 408, a streaming interface in one version of the invention, connects, in one embodiment of the present invention, to a CY123-based ISDN adapter 408 which in turn connects to an EISA or ISA 410 bus in the computer system in which the adapter is installed. They CY123 designation refers to an intelligent control device included in the ISDN*tek (San Gregorio, Calif.) adapter which implements the Q.921 and X.25 data link layer (Layer 2) protocols, the Q.931 and Q.932 network layer (Layer 3) protocols and Recommendation 1.451 for basic call control. Driver WinISDN.dll 420 provides an interface to the hardware adapter 408 and an interface 422 to the JavaISDN layer 424 of software. Next, the JavaISDN layer 424 provides an interface 426 to the Framework layer which includes the Call_Manager and Call objects. Finally, the Call_Manager presents an interface 430 comprising several methods 425 to the Call Center Application 432. Call objects 444 having tables 452 are used by the Call_Manager to carry out the functions of the Framework layer.

Once having passed through the PSTN the caller is presented to the call management system on a B-channel 434 and caller events 436, such as changes in the call connection state, are presented to the system on a D-channel 438, which is shown connected to the Call_Manager through interface ports 440 and 442. D-channel may be shared by more than one call. The ISDN B-channel 434 is connected to one of an array of call objects 444 (as symbolized by the braces 446). Within the array of call objects 446 there is a DTMF detector 448, a voice menu file 450 and a specific call object 444 associated with the call, the call object including a current department table 452. Gates 454, 456, 458 form a multiplexor which receives the voice menu file over path 460 and agent input over path 462 from one of a set of agents 461, where the braces 463 represent the set of agents. The output of the multiplexor on path 460 connects to the caller's B-channel 434 and the state of the Dept field 477 of the table 452 determines whether the voice menu input or the agent input is routed to the caller. If the department field 477 in the table 452 is not null, then the menu file path 460 is coupled to the caller. If the department field is null, then agent voice path 462 is coupled to the caller. Gates 464 and 466 receive the caller input from the B-channel over path 468, which path is also connected to the DTMF detector 448. Gate 464 enables the caller to connect to one agent 461 of the set of agents 463 over path 470 depending on the state of the Agent field in the table 452. Gate 466 enables the caller to connect to voice mail 472 over path 474 depending on the state of the Mail field of the table. If the Agent field is detected as not null over path 476 or if the Mail field is detected as not null over path 478, then one of the respective gates 464 and 466 is enabled. It should be noted that gates 454, 456, 458, 464, and 466 and their associated paths represent the logical connections that the call management system must make and do not represent necessarily any physical paths or devices.

Operation according to the conceptual model is as follows. In the simplest case of "unattended operation," the Call Center Application starts the Call_Manager executing in the Java Run Time Environment (JRE), invokes the Open_ISDN( ) and Init_ISDN( ) methods of the Call_Manager and then waits while the Call_Manager actively fields incoming calls. When a caller lifts handset 402 and dials the directory number of the Call Center the process begins. The call, after being routed through the PSTN 406, is connected to the hardware adapter over an ISDN line B-channel 434 and D-channel 438, regardless of whether the call originates on an ISDN line or a POTS line. Invoking the Open_ISDN( ) method created several call objects 444 and registered these call objects as "Listeners" with the JavaISDN layer 424. These call objects can listen for any type of call or only one type of call, say voice calls. When a call arrives to the ISDN line connected to the Call center, the JavaISDN layer generates an event 427 which causes a Callback into the Listening method of the Call_Manager. The Listening method examines any status information accompanying the Callback and begins to process the incoming call according to the call management policy in effect. The policy in FIG. 8 is one such policy.

If the incoming call is accompanied by caller ID information, the Call_Manager may perform a database lookup to determine whether the caller exists in the caller database (not shown). If so, the call can be transferred to a particular department or handled in a way that is particular to the caller.

If the incoming call does not have caller ID information or if the caller ID cannot be found in the caller database or if a call cannot be transferred based on a predicable pattern of previous calls, then the Call_Manager requests that JavaISDN switch the call from the "Listening" mode to the active mode and to accept the call (by issuing a connect command to the ISDN exchange). The Call_Manager will then register an "Observer" for this call, and add this call to an array of calls.

The Call_Manager tests to determine whether the incoming call is a voice call and if so the Call_Manager links the call to the "main" voice menu according to the current policy. This causes an audio file 450 to be played to the caller over path 460, through the B-channel to the caller's headset 402. In anticipation of DTMF events from the caller in response to the playing of the audio file, the DTMF detector 448 is enabled. When the caller presses a key on his telephone touchpad, the DTMF tone is received by the call object on path 468 via the B-channel.

Because gates 464 and 466 are initially disabled, the DTMF tone reaches the DTMF detector 448. The DTMF detector identifies the key pressed and generates a DTMF event 449 to the Call_Manager 428. The DTMF event is also observed by the Call_Manager Observe( ) method.

When the Call_Manager observes that the call object 444 has detected a DTMF signal, the Call_Manager requests that the Call object return the value of the key pressed by the caller. The Call_Manager now accesses the table 452 embedded in the Call object 444 using the key value to select a row, corresponding to a particular department, of the table. Fields in the selected row are then tested in turn in order to manage the call. First, the Agent field is tested to determine which agent in the current department can receive the call. If the Agent field is not null, then gate 464 is enabled and the call can be transferred over path 470 to one of the agents 461 in the set 463. Also, gate 456 is enabled so that the Agent can converse with the caller over path 460. If the Agent field is null, then the Dept field is tested to determine whether another department table should be used to handle the call. If so, then a new voice menu is played to the caller over path 460 and the B-channel, and a new table is obtained from the database and embedded into the Call object. Again, a DTMF signal is detected from the caller, and a row of the new table is selected. If, according to this row, an the Agent field is not null, then the gate 464 is enabled and the call can be transferred to an agent 461 over path 470. On the other hand, if the Agent field is still null, then the Mail field is tested to determine whether voice mail is available for the current department. If the Mail field is not null, then gate 466 is enabled and the caller can record a message into the mail box 472.

Turning now to FIGS. 10A, 10B, 10C, 10D and 10E these Figures set forth, in greater detail, the flow of operations of the call management system from the time a call enters the system until the call leaves the system. There are three phases to handling an incoming call. The first phase is connecting to an incoming call. The second phase is managing the call according to the department table and caller input as discussed above and the third phase is disconnecting from the call.

Figure 10A:
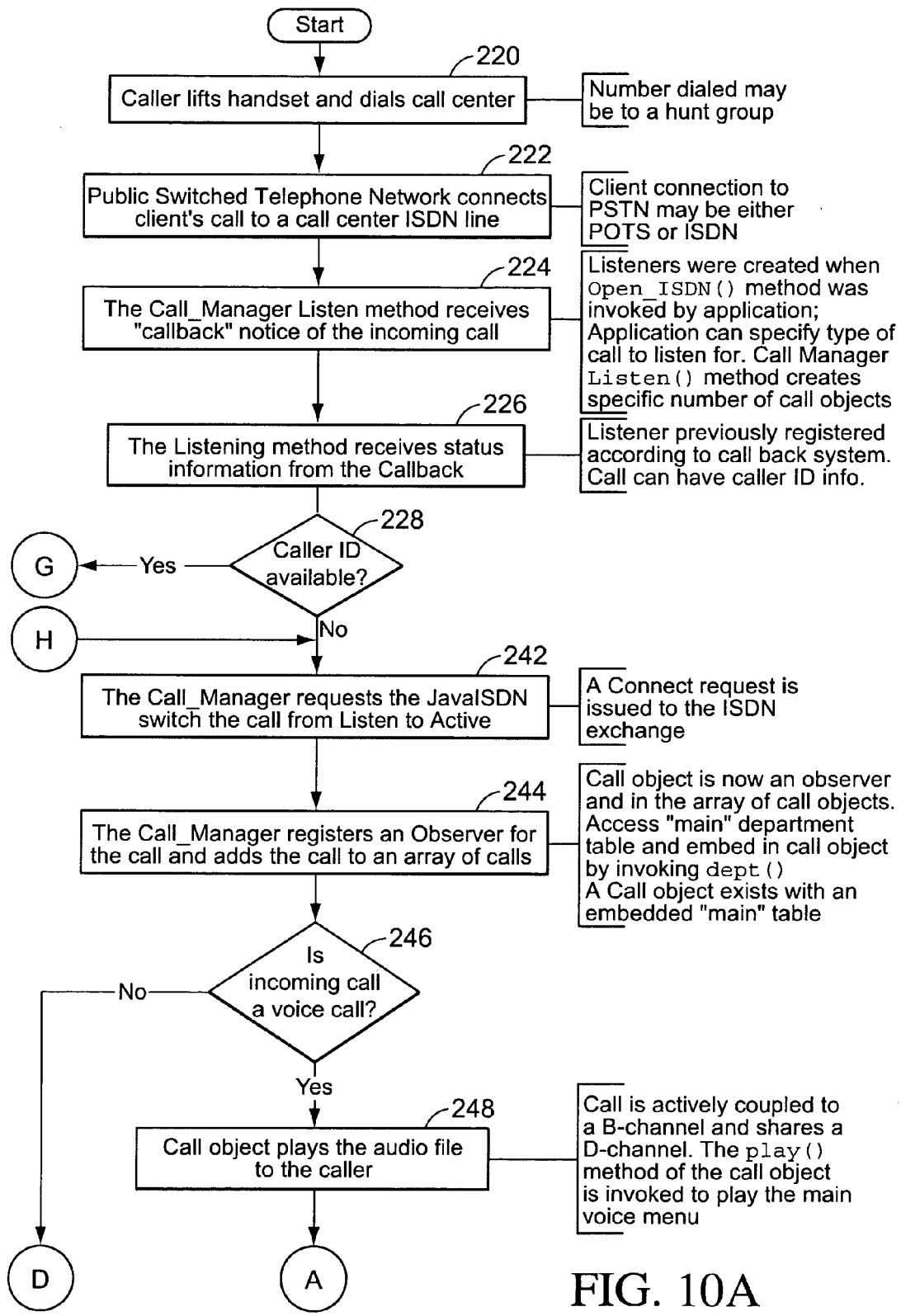

In FIG. 10A, the first phase begins in step 220 when a caller or client lifts his handset 18 in FIG. 2 and dials the directory number of the call center 64 in FIG. 2. The call center may have a directory number which is common to a number of lines in a hunt group. The Public Switched Telephone Network (PSTN) 10 connects in step 222 (directly or indirectly through a remote exchange 16 in FIG. 2) the client's call to the ISDN line 72 in FIG. 2 shown attached to the call center 64. The client handset is connected to the PSTN through line 55 and this line may either be a POTS (Plain Old Telephone System) line or an ISDN line. When the incoming call arrives, the JavaISDN.dll layer generates an event according to the discussion of FIG. 6, which causes a callback into one of a plurality of Listeners of the Call_Manager in step 224. These Listeners were created earlier when the application layer invoked an Open_ISDN( )

method of the Call_Manager. In response to the application layer, the Call_Manager created several Call objects (at least one per line of the hunt group) and registered these Call objects as Listeners with the JavaISDN interface as discussed above in reference to FIG. 6. For each Listener, there is a Call object with a Listen( ) method which includes a call_mask to determines the type of call to listen for, such as voice, data or X.25. Alternatively, the call center application can ask the Call_Manager to listen only for a specific type of call such as a voice call. In step 226 the listener receives status information from the callback. Status information can include a caller ID. If so, as determined in step 228, the Call_Manager performs a database lookup in step 230 of FIG. 10D to determine whether the caller exists in a caller database. Based on the results of the lookup in step 232 the Call_Manager determines whether a definite transfer is possible in step 234 and if so transfers the call in step 236 directly to a certain agent in a certain department. Finally, the Call_Manager disconnects in step 238 from the call. This transfer and disconnect ends the management of the call by the call center. In one alternative, the caller ID information can be used to access table from the database that is specific to the particular caller rather than a department. In another alternative, the caller may need to find some information and call the agent back. In such a case the caller ID is used to transfer the call back directly to the appropriate agent, with the option that a time limit can be imposed on the mechanism.

If, on the other hand, the caller ID is not present or cannot be found in the database or the ID can be found but the call cannot be predictably transferred, then the call is handled by continuing with step 242 of FIG. 10A. In step 242 the Call_Manager requests the JavaISDN to switch the call from the listen mode to the active mode and to accept the call by issuing a CONNECT message (a message according to the Q.931 protocol described in U.S. Pat. No. 5,541,930) over the D-channel to the ISDN switch. This causes the ISDN switch to formally accept the incoming call and to respond with a CONNECT_ACKnowledge message. (In general, events occurring on the ISDN line are indicated by messages on the D-channel which causes interrupts to the WinISDN driver. The driver then calls back to the JavaISDN layer which calls back to the Framework layer as discussed in reference to FIG. 6.) The Call_Manager then registers an Observer for this call and adds the Call object for the call to an array of calls in step 244 which may or may not already contain other active calls. Also occurring in step 244 the Call_Manager accesses the "main" department table from the database and embeds it into the Call object by invoking the dept( ) method. Thus, once step 244 is reached, the Call object is actively coupled to a B-channel and a D-channel of the ISDN line. The Call object can send voice and data over the B-channel and receive voice and data on that channel. Both the Call object and the Call_Manager can also receive notice of events from the D-channel.

Next, in step 246 the Call_Manager tests to determine whether or not the incoming call is a voice call and if so plays an audio file to the caller invoking the play( ) method of the Call object. The Call object plays the voice menu over the B-channel to the caller's headset and can receive caller input signals on the B-channel as well. An example of a voice menu played to a caller is:

"press '1' for sales . . . press '2' for tech support . . . press '3' for accounting . . . press '4' for voice mail . . . press '0' for the operator . . . or stay on the line . . . " This voice menu must be in one-to-one correspondence with current table, in this case "main" for the system to operate predictably.

Figure 10B:
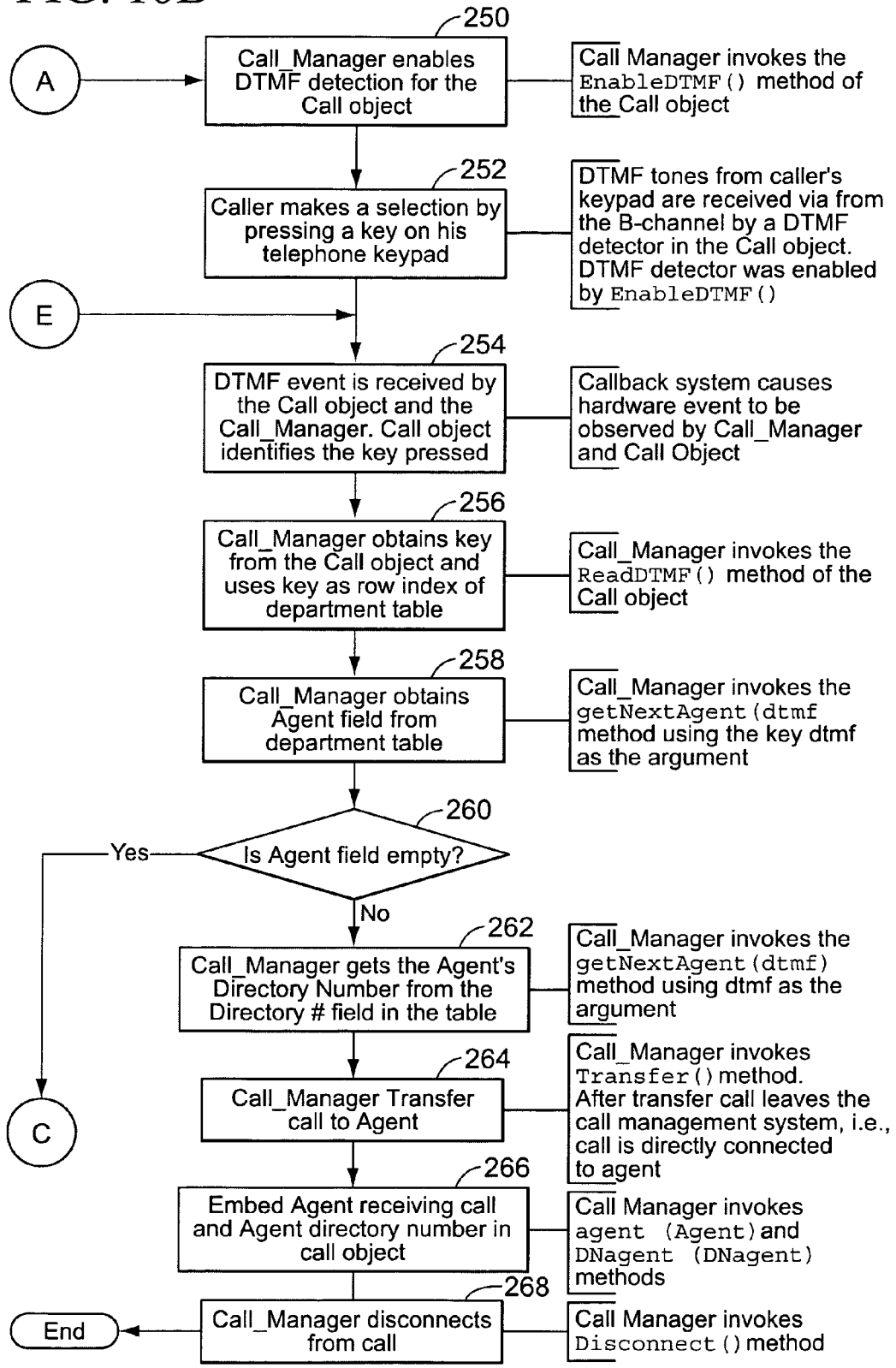

In anticipation of receiving caller input signals responsive to the voice menu the Call_Manager invokes the EnableDTMF( ) method in step 250 of FIG. 10B, where EnableDTMF( ) is a method possessed by Call objects of the voice call type. In the preferred embodiment of the present invention, the call is a "streaming" type call in which both transmitted and received data are allowed on the channel. The call type is set when an Observer is registered for the call according to FIG. 6.

In step 252 the caller makes a selection by pressing a key on this telephone keypad. This causes a DTMF tone to be received on the B-channel by a DTMF Detector in the Call object and by the Call_Manager in step 254 according to the callback mechanism. The DTMF Detector was enabled by the EnableDTMF( ) method and decodes the tones to determine which key was pressed by the caller.

In step 256 the Call_Manager obtains the key from the Call object by invoking the ReadDTMF( ) method and uses the key as an index into a row, say row 2, of the current department table embedded in the Call object, in this case the "main" department table.

Next, in step 258 the Call_Manager obtains the contents of the Agent field, Eddie from the "main" table, by invoking the getNextAgent(dtmf) method, where the argument dtmf represents row index, 2, according to the key pressed by the caller. Having obtained the contents of the Agent field, the Call_Manager must next test in step 260 the field to determine whether the field is empty. In one version of the invention, the Agent field and the Agent Status field are tested together to determine whether or not an agent is available. Since the field is not empty (and the agent is available), the Call_Manager now gets the Agent's directory number, 97671111, from the Directory # field in the table by invoking in step 262 the getAgentDN(dtmf) method. With this information the Call_Manager can transfer the call to the agent by invoking the Transfer( )method in step 264. The transfer method causes the switch to connect the caller directly to the agent and to issue a message on the ISDN channel to the call center indicating that call center connection to the call has been released. The Call_Manager receives notice of the successful transfer event and invokes the agent(Agent) method and the DNagent(Agent) method, where Agent is the contents of the Agent field of the table, to embed the agent and the agent's number in the Call object in step 266. The Call object is then converted back to a listener to await another incoming call.

Figure 10C:
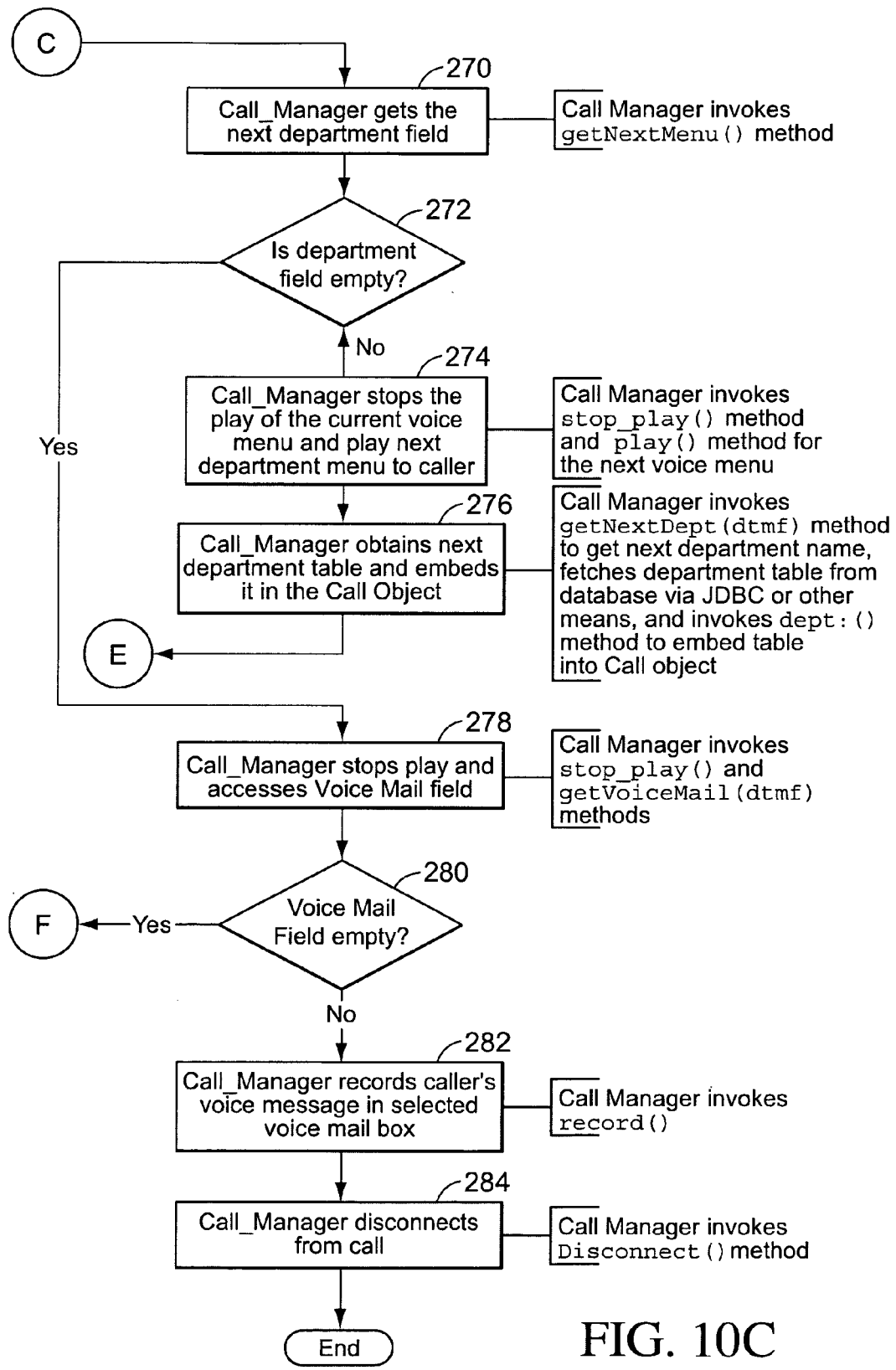
Figure 10D:
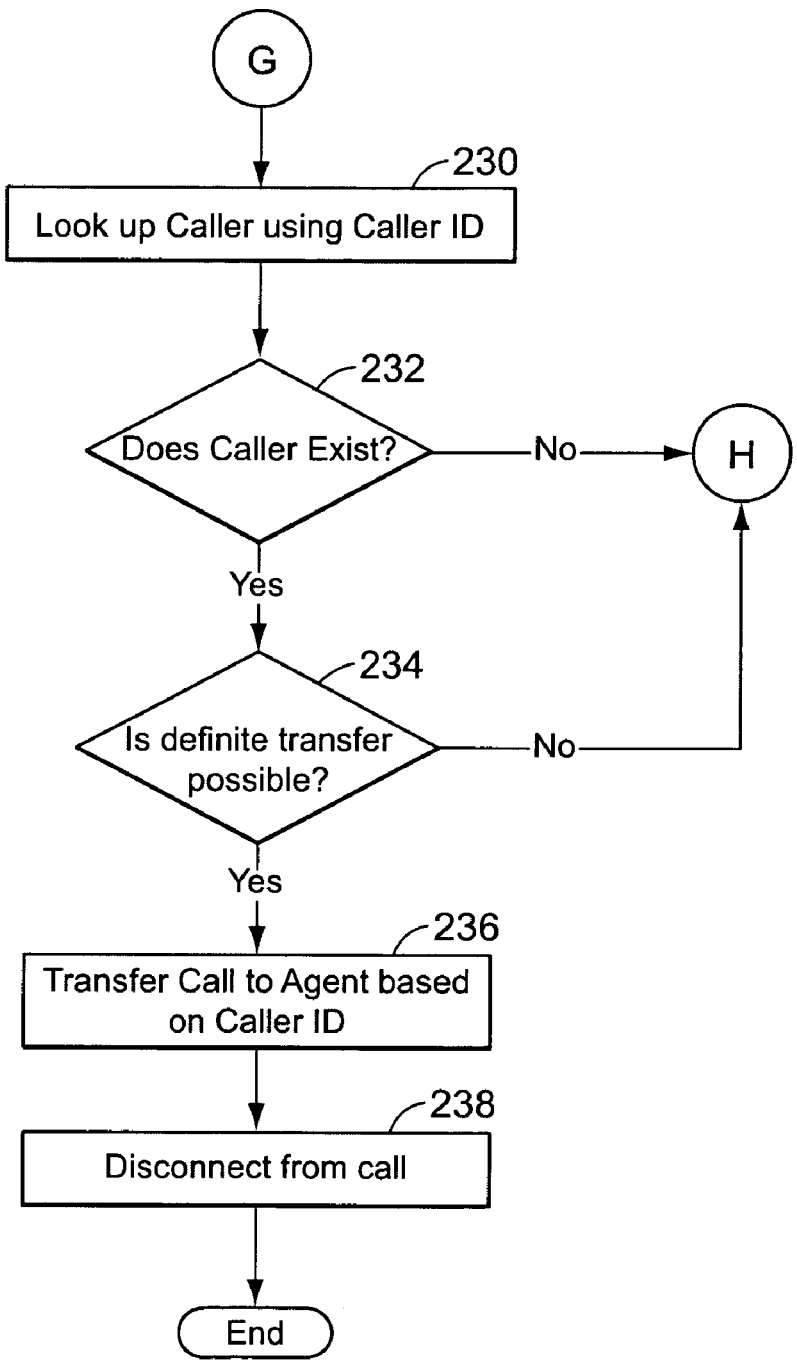

If the Agent field of the table is empty (the caller pressed 1 to select "Sales") then flow proceeds to step 270 in FIG. 10C at which point the Call_Manager obtains the department field from the table, Sales, by invoking the getNextMenu(dtmf) method. If the department field is not empty as determined in step 272, the Call_Manager invokes the stop_play( ) method for the current voice menu and invokes the play( ) method for the new voice menu in step 274. Next, in step 276, the Call_Manager obtains the name of the next department table with the getNextDept(dtmf)method, fetches the table from the database and invokes the dept( ) method to embed the new table in the Call object. In a preferred version of the invention, the department table is accessed from the database by means of a JDBC (Java Data Base Connectivity) which is a standard Java application program interface (API) for talking to an SQL database. This database can be the intranet business database 38 as discussed in reference to FIG. 2 or it can be a remote database including an Internet database. After the new table is fetched and embedded in the call object flow continues at step 254 in FIG. 10B.

If the caller now selects '0' then the call will be transferred to Karen at directory number 41. If the caller selects '1', the call will be transferred back to the "main" department.

If the department field in step 272 is empty, the flow continues at step 278 at which the Call_Manager invokes the stop_play( ) method and the getVoiceMail(dtmf) method to prepare to transfer the call to a voice mail box. The latter method selects the voice mail box and in step 280 the Call_Manager tests the field to determine whether or not the voice mail box field is empty. If not, then, in step 282, the Call_Manager invokes the record( ) method to record the caller's message into the mail box after which it disconnects in step 284 from the call by invoking Disconnect( ).

Figure 10E:
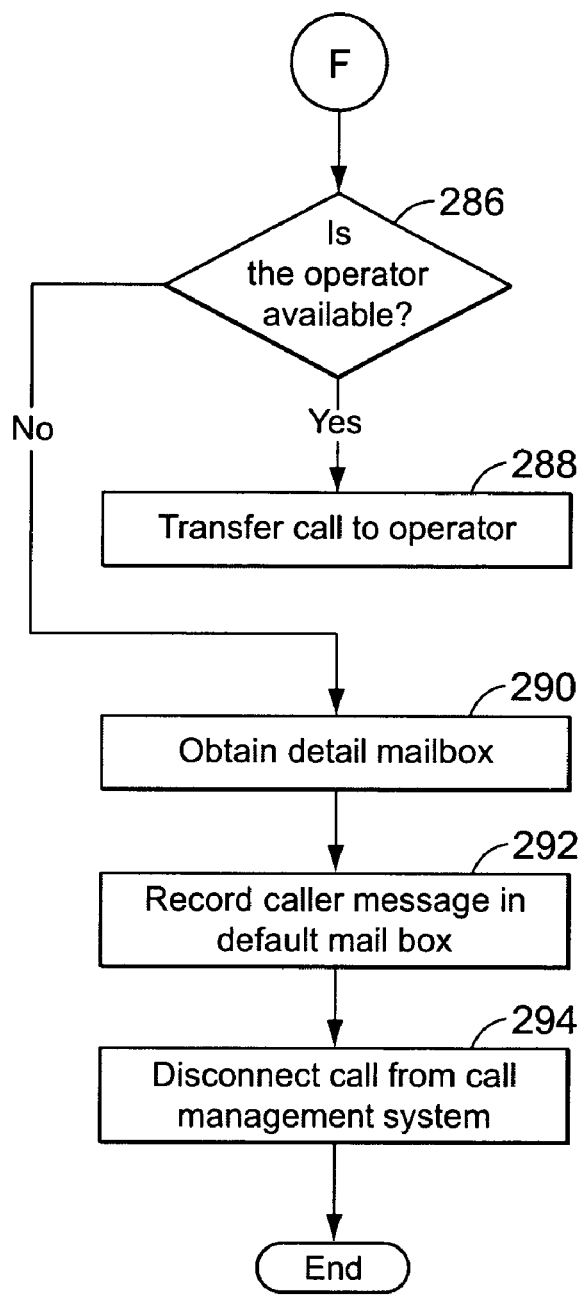

If no agent is available, and there is no next department, and no voice mail box, the Call_Manager flow continues at step 286 of FIG. 10E to determine whether the operator is available. If so the call is transferred to the operator in step 288. Otherwise, in step 290 the default voice mail box is obtained and the caller's message is recorded in that mailbox. Finally, the Call_Manager disconnects from the call in step 294.

FIGS. 11A through 11C show sample Java code for implementing the various steps of the process. In FIG. 11A, the Java representative code for the Listen( ) method 300 of the Call_Manager is set forth. This method is invoked by the call center application layer, in particular by an invocation of the Init( ) method, and creates a system specific maximum number of ISDNcall objects. This code tests an array of Call-handles, Caller[n] which is maintained by the Call_Manager. If a particular handle is zero, the Manager instantiates a new Call object, Call[n] for index n via Call[n]=new ISDNcall( ); where Call[n] becomes the nth call in the Call array and where ISDNcall( ) is a constructor for the ISDNcall class created from ISDNcall.java by the java compiler, as is well known to those skilled in the art. The Call_Manager then invokes the Listen( ) method on the newly created Call object, with a Call_mask denoting the type of calls to listen for. A result of creating a new call object is that a static method static{System.loadLibrary ("JavaISDN");} is invoked. The "System" class, which is part of the Java environment, searches a library path for a JavaISDN.dll file and dynamically loads and links it, as is standard for Microsoft Windows TM configurations. Equivalent loading and linking mechanisms exist for UNIX platform-based Java as well.

As discussed above, the JavaISDN.dll is the layer of software between the Framework layer and the WinISDN driver layer. The JavaISDN.dll provides an implementation of all of the "native" methods for the ISDNcall class. These native methods are those that must be provided "outside" of the Java platform, in this case because there is nothing inside the Java platform that "knows about" ISDN. Thus the JavaISDN.dll serves as the interface between the ISDNcall class and the WinISDN API, which is an open standard application programmer's interface. The WinISDN API responds to specific "C" language calls in a Windows TM environment and manages the ISDN hardware.

FIG. 11B sets forth two portions of representative Java code. The first portion 302 is Java code for transferring a call to an agent as described in step 258 through 266 of FIG. 10B. In the code the department table embedded in the Call object is accessed by invoking the dept( ) method for a particular Call object, Call[n]. (The Call_Manager takes care of the proper index n and accesses the particular Call object for the call it is managing.) Next the getNextAgent(dtmf) method is invoked to obtain the Agent field and the "if" statement determines whether the Agent field is not null. If so, the code gets the agent's directory number using dtmf as the row index into the department table and transfers the call by invoking the Transfer( ) method on the Call object. Code following the first else must determine how to handle a failed attempt to transfer the call to the agent.

If no agent is available or appropriate to transfer the call to, the second portion of code 304 is entered. This portion of the code corresponds to steps 270 through 276. First, according to the code, a new department table field of the current table is obtained with the getNextMenu(dtmf) method, the play of the current voice menu is stopped with stop_play( ) and the table field is tested to determine whether the field is null. If the field is not null, then a menuLink is obtained and if it is not null a new voice menu is played to the caller by invoking the play(menuLink) method. Next, the new department table itself is obtained by invoking the getNextDept (dtmf) method to get the new department name and if not null, the new department table is obtained from a database. As described above the database can be either a local database or a remote database and can be accessed via a JDBC API. Finally, the table is embedded into the Call object by invoking the dept(Tmodel[Department[n]]) method. This latter code covers the case where the database is local.

If no agent is available and there is no next menu, then the Java code proceeds to code portion 306 in FIG. 11C. In this portion, the current voice menu is stopped and a voice mail box field is obtained. If the field is not null the caller's voice message is recorded into the voice mailbox.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method, in a data processing system having a plurality of computing nodes, of managing incoming calls for an organization having a plurality of departments, an organization database and a plurality of agents, the method comprising the steps of:
   (a) receiving an incoming voice call by a call manager object, a call manager object being present in each of the plurality of computing nodes;
   (b) creating an associated call object for each incoming call in response to receiving the incoming call;
   (c) playing to the caller a voice menu corresponding to a plurality of selection items in a department table for the organization, each call object including the department table with which the call is currently associated;
   (d) receiving an input signal from the caller in response to the voice menu played to the caller, the input signal specifying one of the plurality of selection items in the department table;
   (e) determining whether or not an agent is available for the selected item in the department table;
   if an agent is available, (f) obtaining the agent's number from the department table and transferring the call to the agent and continuing at step (h);
   if an agent is not available and if another department table is available, (g) obtaining another department table from the organization database and continuing at step (c); and
   (h) disconnecting from the caller.

2. A method of managing incoming calls for an organization having a plurality of departments, an organization database and a plurality of agents as recited in claim 1, further comprising the steps of:

prior to step (h),
if another department table is not available, (j) determining from the table whether department voice mail is available;
if department voice mail is available, (k) recording a voice message from the caller;
if department voice mail is not available, (l) determining whether an operator is available;
if the operator is available, (m) transferring the call to the operator; and
if the operator is not available, (n) recording a voice message from the caller.

3. A call management system for an organization having a plurality of departments and a plurality of agents, comprising:
a plurality of computer processing nodes;
an ISDN interface adapter connected to multiple ISDN B-channels and at least one computer processing node;
a main memory included in each computer processing node connected to an ISDN channel, wherein the main memory stores a computer program instructing the computer processing node to carry out the steps of:
receiving an incoming call from a caller by a call manager object;
creating an associated call object for each incoming call in response to receiving the incoming call;
playing a voice menu corresponding to a plurality of selection items in a department table for the organization to the caller over an ISDN B-channel, each call object including the department table with which the call is currently associated;
detecting incoming signals from the caller on an ISDN-B channel in response to a voice message played for the caller;
accessing the table based on the incoming signals from the caller; and
connecting the caller to any available agent according to a call-management policy based on the table.

4. A method, in a data processing system having a plurality of computing nodes, of managing incoming calls for an organization having a plurality of departments and a plurality of agents, the method comprising the steps of:
receiving an event indicating a call from a non-object software driver that is connected to communication hardware;
receiving notice in a non-object driver interface software of the call event from the software driver;
receiving notice by a call manager object of the call event from the driver interface software, a call manager object being present in each of the plurality of computing nodes, and each call manager object including an observer method, a table access method, and a call object activation method;
activating a call object for each call in response to receiving notice of the call from the driver interface layer, wherein the activated call object includes a department method for embedding a department table into the activated call object, a play method for playing a voice menu to a caller, a record method for recording a voice message from the caller, a get number method for obtaining a number to which a call may be transferred, and a transfer method for transferring calls to a number; and
embedding a department table into the activated call object by invoking the department method of the call object, the embedded department table becoming the current department table, wherein the department table includes an agent field that indicates whether or not a particular agent is available;
causing the associated call object to play to the caller a voice menu by invoking the play method of the activated call object, wherein the voice menu describes a plurality of selection items in the current department table, the voice menu being sent to the caller via the interface and driver software;
receiving, by using the observer method, a selection event input from the caller in response to the voice menu played to the caller, wherein the selection event input is received via the driver and interface software;
accessing, by using the table access method, the agent field in the current department table in the activated call object based on the selection event input to determine whether or not a particular agent is available; and
if the particular agent is available based on the current department table, obtaining the particular agent's directory number by invoking the agent number method, and causing the call to be transferred to the number of the particular agent, by invoking the transfer method of the activated call object.

5. A method of managing incoming calls as recited in claim 4,
wherein the activated call object includes a get next menu method for obtaining another department table; and
further comprising,
if the agent is not available based on the current department table, obtaining another department table, using the get next menu method of the activated call object, embedding the other department table into the activated call object using the department method, the other department table becoming the current department table, and accessing, by using the table access method, the agent field in the current department table in the activated call object based on the selection event input to determine whether or not a particular agent is available; and
if the particular agent is available based on the current department table, obtaining the particular agent's directory number by invoking the agent number method, and causing the call to be transferred to the number of the particular agent, by invoking the transfer method of the activated call object.

6. A method of managing incoming calls as recited in claim 4, wherein the selection event is a DTMF tone produced by the caller.

7. A method of managing incoming calls as recited in claim 4, wherein the selection event is a recognized voice input from the caller.

8. A method of managing incoming calls as recited in claim 4,
wherein the organization has an organization database; and
wherein the plurality of agents includes local agents and one or more remote agents, each of which can have access to the organization database.

9. A method, in a data processing system having a plurality of computing nodes, of managing incoming calls for an organization having a plurality of departments and a plurality of agents, the method comprising the steps of:
receiving one or more incoming calls by a call manager object, a call manager object being present in each of the plurality of computing nodes, wherein the call manager object includes an observer method and a table access method;
creating an associated call object for each incoming call in response to receiving the incoming call, wherein the call object includes a department method for embedding a department table in the associated call object, a play method for playing a voice menu to a caller, a record method for recording a voice message from the caller, a transfer method for transferring calls to a party, and a department table that is accessible by the call manager object via its table access method and includes a voice mailbox field and an agent field;

causing the associated call object to play to the caller a voice menu by invoking the play method of the call object associated with the call, wherein the voice menu describes a plurality of selection items in the department table corresponding to a department in the organization, the department table being associated with the current call;

receiving, by means of the observer method, a selection event input from the caller in response to the voice menu played to the caller;

determining whether or not the agent field and the voice mail box field are empty by invoking the table access method of the associated call object;

causing a caller's voice to be recorded, based on a selection event input by the caller, by invoking the record method of the associated call object; and causing the call to be transferred, based on the selection event input of the caller, if the agent field is not empty, by invoking the transfer method of the associated call object, wherein all of said steps are performed by call object's interaction with said call manager, and without call objects having to instantiate any additional objects.

10. A computer readable medium having stored thereon a computer program for implementing a Java Based telephone call distribution system, capable of managing the distribution of incoming calls to a plurality of agents, the computer program comprising:

at least one call object having a class corresponding to a first of two Java telephony object types, and including a department table, each call object possessing at least a listen( ) method listening for specific types of calls, a dept( ) method embedding a department table in said call object, a transfer( ) method initiating a call transfer, an agent( ) method accessing an agent field of said department table, a play( ) method playing to a caller a voice file retrieved from the department table, a record( ) method recording caller voice and saving through said department table, and a readDTMF( ) method accessing DTMF tones from a caller and using said tones as an index into said department table;

a call manager object having a class corresponding to the second of two Java telephony object types, and implemented in each node of the distributed system, said call manager object creating a call object for each incoming call and possessing an observe( ) method observing events associated with said call object; and an interface layer that is accessed by said call manager object and said call object and that provides a Java native interface to ISDN driver software;

wherein said Java objects and said Java native interface software are being compiled by a Java compiler and executed on a Java Virtual machine with no other telephony objects being required for operation.

11. A method, in a data processing system having a plurality of computing nodes, of managing incoming calls for an organization having a plurality of departments and a plurality of agents, the method comprising the steps of:

receiving one or more incoming calls by a call manager object, a call manager object being present in each of the plurality of computing nodes;

creating an associated call object for each incoming call in response to receiving the incoming call;

playing to the caller a voice menu describing a plurality of selection items in a department table corresponding to a department in the organization, each call object including the department table with which the call is currently associated;

receiving one or more input signals from the caller in response to the voice menu played to the caller; and managing the incoming call according to a call-management policy based on the information contained in the table and the input signals from the caller to attempt to reach one of the plurality of agents of the organization.

12. A method of managing incoming calls as recited in claim 11, wherein the step of receiving an incoming call includes the steps of:

listening for an incoming call; and connecting to the incoming call when it occurs.

13. A method of managing incoming calls as recited in claim 11, wherein the step of receiving one or more input signals from the caller includes the steps of:

receiving a selection event from the caller by the call object; and determining from the selection event which of the selection items in the department table was selected by the caller.

14. A method of managing incoming calls as recited in claim 13, wherein the selection event is a DTMF tone produced by the caller.

15. A method of managing incoming calls as recited in claim 13, wherein the selection event is a recognized voice input from the caller.

16. A method of managing incoming calls as recited in claim 11, wherein the organization has an organization database; and wherein the plurality of agents includes local agents and one or more remote agents, each of which can have access to the organization database.

17. A method of managing incoming calls as recited in claim 16, wherein a remote agent is connected to the organization through an ISDN line.

18. A method of managing incoming calls as recited in claim 17, wherein remote agents communicate information to the organization over the D-channel of the ISDN using X.25 protocol.

19. A method of managing incoming calls as recited in claim 18, wherein the information communicated includes agent status and queries not visible to the caller.

20. A method of managing incoming calls as recited in claim 16, wherein remote agents can communicate to each other and to local agents over the Internet.

21. A method of managing incoming calls as recited in claim 11, wherein the incoming call has caller ID information associated with it; and wherein the step of managing the incoming call according to the call-management policy includes:

transferring the incoming call to an agent based on the caller ID information; and disconnecting from the call.

22. A method of managing incoming calls as recited in claim 11, wherein the department table can contain Java objects.

23. A method of managing incoming calls as recited in claim 22, wherein a Java object in the table is a voice menu file.

24. A method of managing incoming calls as recited in claim 22, wherein a Java object in the table is an XML object.

25. A method of managing incoming calls as recited in claim 22, wherein a Java object in the table is a file object.

26. A method of managing incoming calls as recited in claim 22, wherein a Java object in the table is another table object.

27. A method of managing incoming calls as recited in claim 11, wherein the department tables are JDBC-accessible tables.

28. A method of managing incoming calls as recited in claim 11, wherein each call object is an element of an array of call objects managed by the call manager object.

29. A method of managing incoming calls as recited in claim 11, wherein the call manager object can invoke any one of the call objects to play a voice menu, record a caller message, to transfer a call, or to obtain another department table for the call associated with the call object.

30. A method of managing incoming calls as recited in claim 11, wherein the call object is capable of being coupled to an ISDN PSTN system and capable receiving notice of and responding directly to ISDN events upon their occurrence.

31. A method of managing incoming calls as recited in claim 11, wherein the call manager object is capable of being coupled to an ISDN PSTN system and capable of receiving notice of and responding directly to ISDN events upon their occurrence.

32. A method of managing incoming calls as recited in claim 11,
wherein the table includes alternate routing information;
wherein the step of managing the incoming call according to a call-management policy includes the steps of:
determining if an agent is available according to the department table described in the voice menu;
if the agent is available, obtaining the agent's directory number from the table, transferring the call to the agent, and disconnecting from the call; and
if the agent is not available, handling the call according to alternate routing information.

33. A method of managing incoming calls as recited in claim 32, wherein the alternate routing information includes voice mail box information and operator information;
wherein the step of handling the call according to the alternate routing information includes the steps of:
determining whether or not voice mail box is available for the department according to the department table;
if voice mail is available, recording a message from the caller and storing it in the voice mail box;
if voice mail is not available, determining whether the operator is available;
if the operator is available, transferring the caller to the operator; and
if the operator is not available, recording a message from the caller in the default mailbox disconnecting from the caller.

34. A method of managing incoming calls as recited in claim 11,
wherein the department table has a plurality of rows and columns; and
wherein a row in the department table is selected by the input signals from the caller; and
wherein the columns of the selected row contain information used by the call manager object to implement the call-management policy.

35. A method of managing incoming calls as recited in claim 34
wherein the columns of the selected row include fields for specifying: voice menu file for the selected row, the availability of an agent, the agent's directory number, the availability of another department and the availability of voice mail for the department for the call-management policy.

36. A computer readable medium for a data processing system having a plurality of computing nodes, the medium having stored thereon a computer program for managing incoming calls for an organization having a plurality of departments, and a plurality of agents, the program residing on each computing node of the data processing system and instructing each node to carry out the steps of:
receiving one or more incoming calls;
creating an associated call object for each incoming call in response to receiving the incoming call;
playing to the caller a voice menu describing a plurality of selection items in a department table corresponding to a department in the organization, each call object including the department table with which the call is currently associated;
receiving one or more input signals from the caller in response to the voice menu played to the caller; and
managing the incoming call according to a call-management policy based on the information contained in the table and the input signals from the caller to attempt to reach one of the plurality of agents of the organization.

37. A computer readable medium as recited in claim 36, wherein the table includes agent availability information and alternative routing information.

38. A computer readable medium for storing thereon a call management software system for managing incoming calls to an organization having a plurality of departments and a plurality of agents, the system comprising:
a call object associated with each incoming call, the call object including a plurality of call object methods and a table associated with a department, the table containing information to guide the management of the incoming call; and
a call manager object being present in each of a plurality of computing nodes and including a plurality of call manager object methods, the call manager object for creating a call object for each incoming call, for embedding the table into the call object and for invoking methods of the call object based on the information in the table to attempt to transfer the call to an agent of the organization.

39. A computer program for managing incoming calls to an organization having a plurality of departments and a plurality of agents, as recited in claim 38, further including a Java-ISDN interface program for implementing one or more of the call object methods in native code and for providing an interface which allows the call manager object and call objects to respond to hardware events pertaining to the incoming call.

40. A computer program for managing incoming calls to an organization having a plurality of departments and a plurality of agents as recited in claim 38, wherein the table is a JDBC-accessible table.

41. A computer program for managing incoming calls to an organization having a plurality of departments and a plurality of agents as recited in claim 38, wherein the table contains Java objects.

* * * * *